United States Patent
Hsieh et al.

(10) Patent No.: US 7,268,336 B2
(45) Date of Patent: Sep. 11, 2007

(54) IMAGE DETECTING MODULE

(75) Inventors: Wen-Hung Hsieh, Taichung (TW);
Jian-Chao Liao, Taichung (TW);
Ching-Jung Tsai, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/393,116

(22) Filed: Mar. 30, 2006

(65) Prior Publication Data
US 2007/0034782 A1 Feb. 15, 2007

(30) Foreign Application Priority Data
Aug. 10, 2005 (CN) .................. 2005 1 0091216

(51) Int. Cl.
*G03B 5/00* (2006.01)
*H01J 40/14* (2006.01)

(52) U.S. Cl. .............. 250/208.1; 250/216; 348/208.99; 396/13; 396/55

(58) Field of Classification Search ............. 250/208.1, 250/216, 201.2; 396/13, 55; 359/554; 348/208.99, 348/208.4, 208.7
See application file for complete search history.

(56) References Cited

U.S. PATENT DOCUMENTS 5,266,988 A 11/1993 Washisu ................... 354/70
2006/0017818 A1* 1/2006 Enomoto ............. 348/219.1

FOREIGN PATENT DOCUMENTS

JP 2003111449 4/2003

* cited by examiner

*Primary Examiner*—Kevin Pyo
(74) *Attorney, Agent, or Firm*—Thomas, Kayden, Horstemeyer & Risley

(57) ABSTRACT

An image detecting module. The image detecting module comprises a base, a seat movably disposed on the base, an image detecting unit disposed on the seat, a first guide member by which the seat is joined to the base, moving relative to the base in a first direction, a first coil disposed on either the base or the seat, a first magnet disposed on either the base or the seat and opposite to the first coil, and a first Hall element disposed on either the base or the seat and adjacent to the first coil. A magnetic force is generated between the first coil and the first magnet by providing a voltage to the first coil, thereby moving the seat in the first direction along the first guide element.

9 Claims, 8 Drawing Sheets

IMAGE DETECTING MODULE

BACKGROUND

The invention relates to an image detecting module, and in particular to an image detecting module having an image detecting unit with 2-dimensional motion.

Referring to FIG. 1, U.S. Pat. No. 5,266,988 discloses an image shake suppressing device for a camera. The image shake suppressing device is mounted in a lens. When the camera is used, an angular velocity meter measures the angular velocity of the moving camera and provides the measured data to a circuit to drive a driving part moving the lens in a direction of a vertical optical axis, thereby compensating or suppressing blurring due to vibration of the camera.

Because the lens, however, is moved in a vertical optical axis, the MTF value thereof is reduced. This compensation method has limited compensation effect and may reduce image quality.

Referring to FIGS. 2A and 2B, Japan patent No. 3551174 discloses a moving mechanism. The moving mechanism employs piezoelectric elements to drive an image detecting unit, such as CCD, in a vertical direction, such that blur can be compensated or suppressed, and it is applicable to any lens.

The piezoelectric elements must be driven by voltage to move the CCD. As the CCD, however, is heavier than a single lens, a large piezoelectric element is needed, increasing the volume of the camera.

SUMMARY

An embodiment of an image detecting module of the invention comprises a base, a seat movably disposed on the base, a image detecting unit disposed on the seat, a first guide member by which the seat is joined to the base and moves relative to the base in a first direction, a first coil disposed on either the base or the seat, a first magnet disposed on either the base or the seat and opposite the first coil, and a first Hall element disposed on either the base or the seat and adjacent to the first coil. A magnetic force is generated between the first coil and the first magnet by providing a voltage to the first coil, thereby moving the seat in the first direction along the first guide element.

The first guide element comprises a plurality of first holding portions disposed on the base and the seat respectively, and a pair of first shafts held parallel by the first holding portions, whereby the seat is joined to the base, and the seat moves along the axis of the first shaft.

The seat further comprises a movable plate movably disposed on the seat, and a circuit board joined to the movable plate, whereby the image detecting unit is electrically connected to the circuit board and fixed on the base.

The image detecting module further comprises a second guide element by which the movable plate is joined to the seat and moves relative to the seat in a second direction, a second coil disposed on either the base or the movable plate, a second magnet disposed on either the base or the movable plate and opposite the second coil, and a second Hall element disposed on either the base or the movable plate and adjacent to the second coil. A magnetic force is generated between the second coil and the second magnet by providing a voltage to the second coil, thereby moving the seat along the second guide element in the second direction.

The second guide element comprises a plurality of second holding portions disposed on the seat and the movable plate respectively, and a pair of second shafts held parallel by the second holding portions, whereby the movable plate is joined to the seat and moves along the axis of the second shaft.

The axis of the second shaft is perpendicular to the axis of the first shaft.

The first magnet comprises an N pole and an S pole disposed along the axis of the first shaft. The second magnet comprises an N pole and an S pole disposed along the axis of the second shaft.

When the image detecting module is idle, two halves of the first Hall element are located on the N pole and the S pole of the first magnet respectively.

When the image detecting module is idle, two halves of the second Hall element are located on the N pole and the S pole of the second magnet respectively.

BRIEF DESCRIPTION OF THE DRAWINGS

The invention can be more fully understood by reading the subsequent detailed description and examples with references made to the accompanying drawings, wherein.

DETAILED DESCRIPTION

Before the description, it is noted that location language, such as first direction X, second direction Y, or third direction Z, is based on the coordinate of each individual figure, and the first direction X, second direction Y, and the third direction Z are orthogonal.

Figure 1:
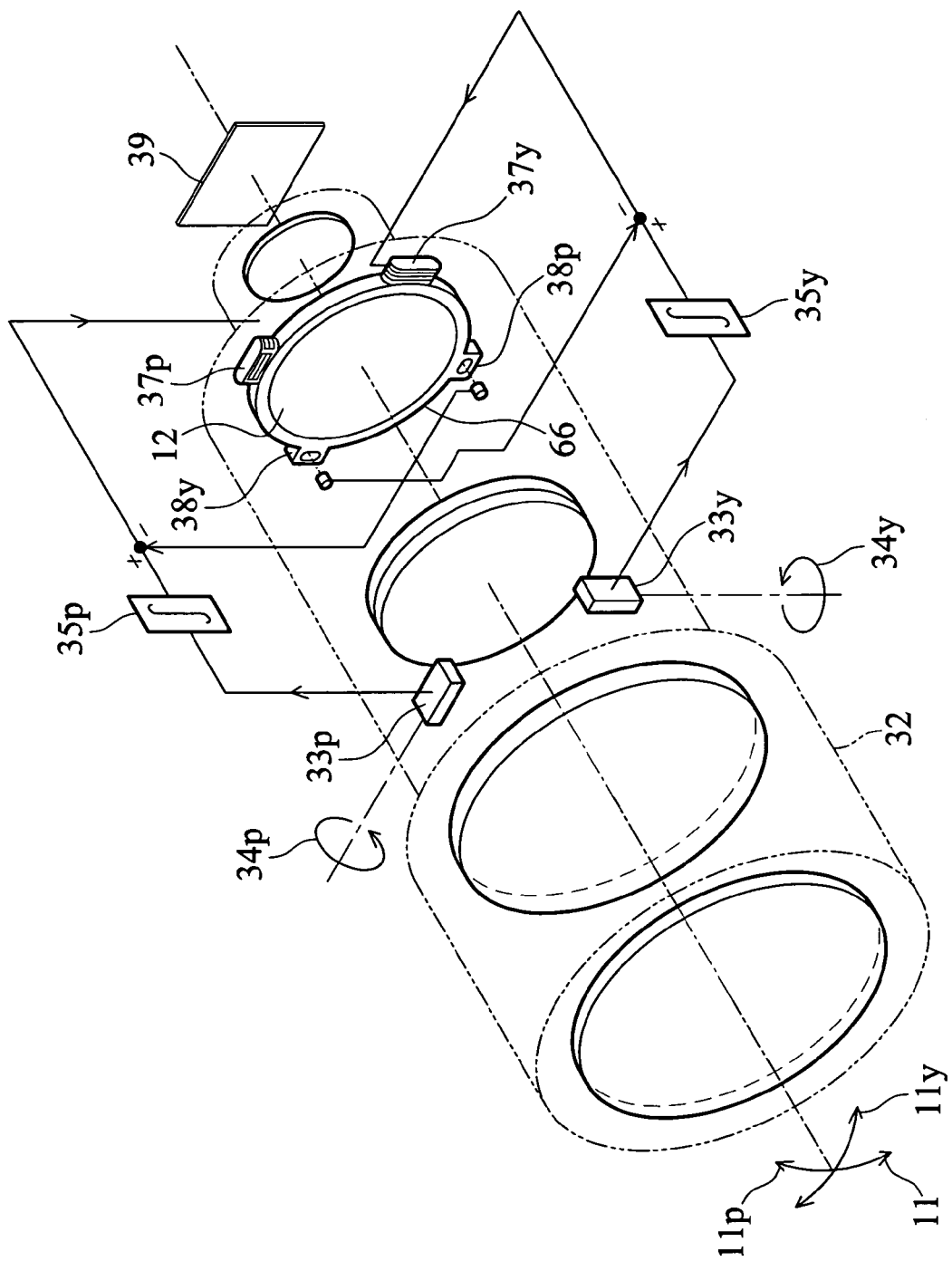
FIG. 1 depicts an image shake suppressing device disclosed in U.S. Pat. No. 5,266,988.
Figure 2A:
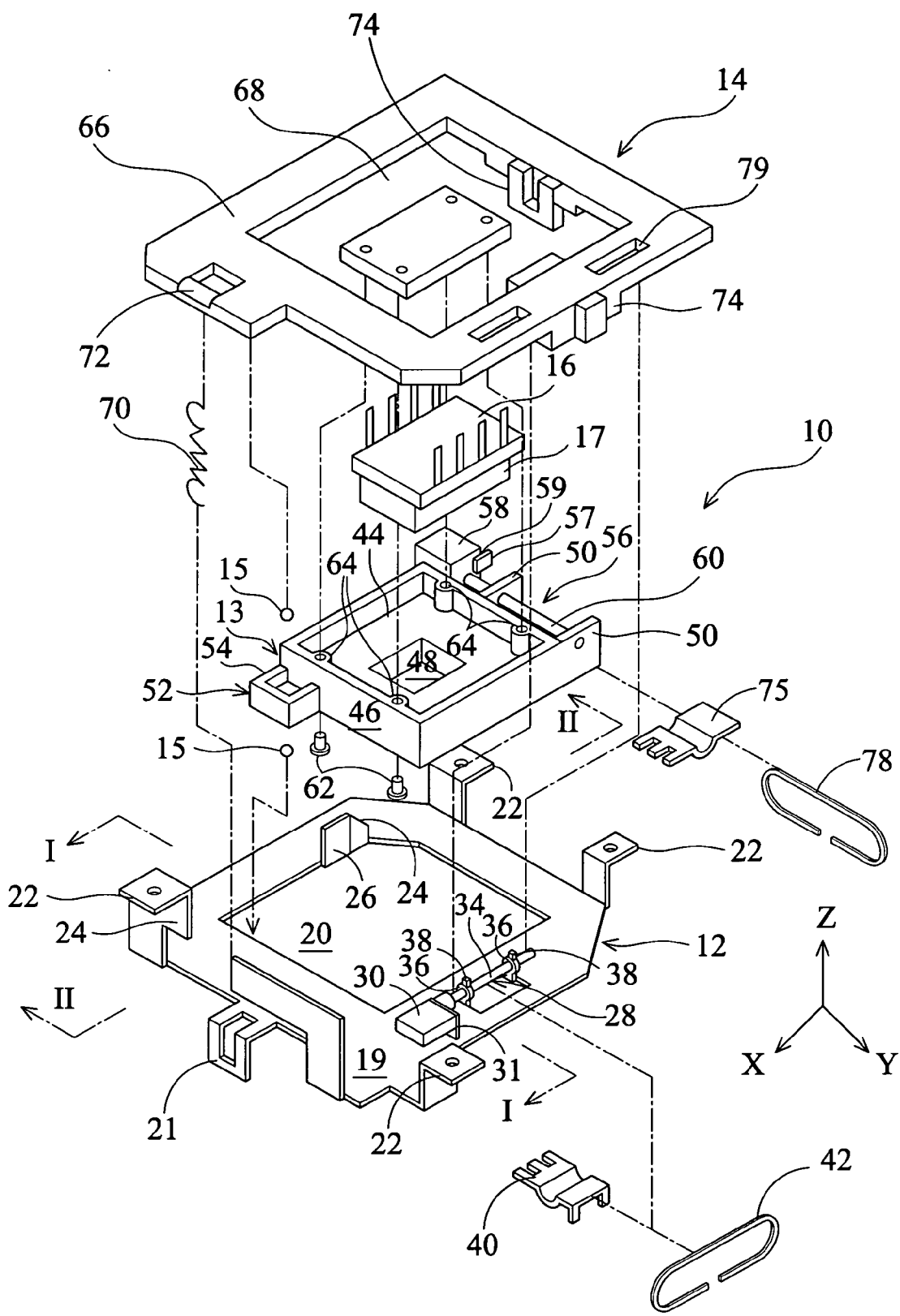
FIGS. 2A and 2B depict a moving mechanism disclosed in Japan Patent No. 3551174.
Figure 2B:
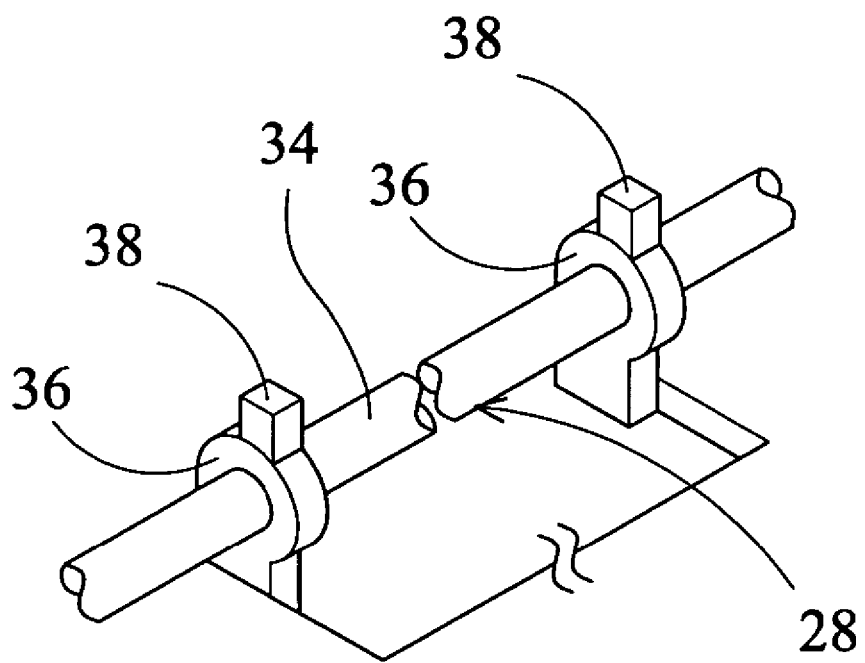
Figure 3:
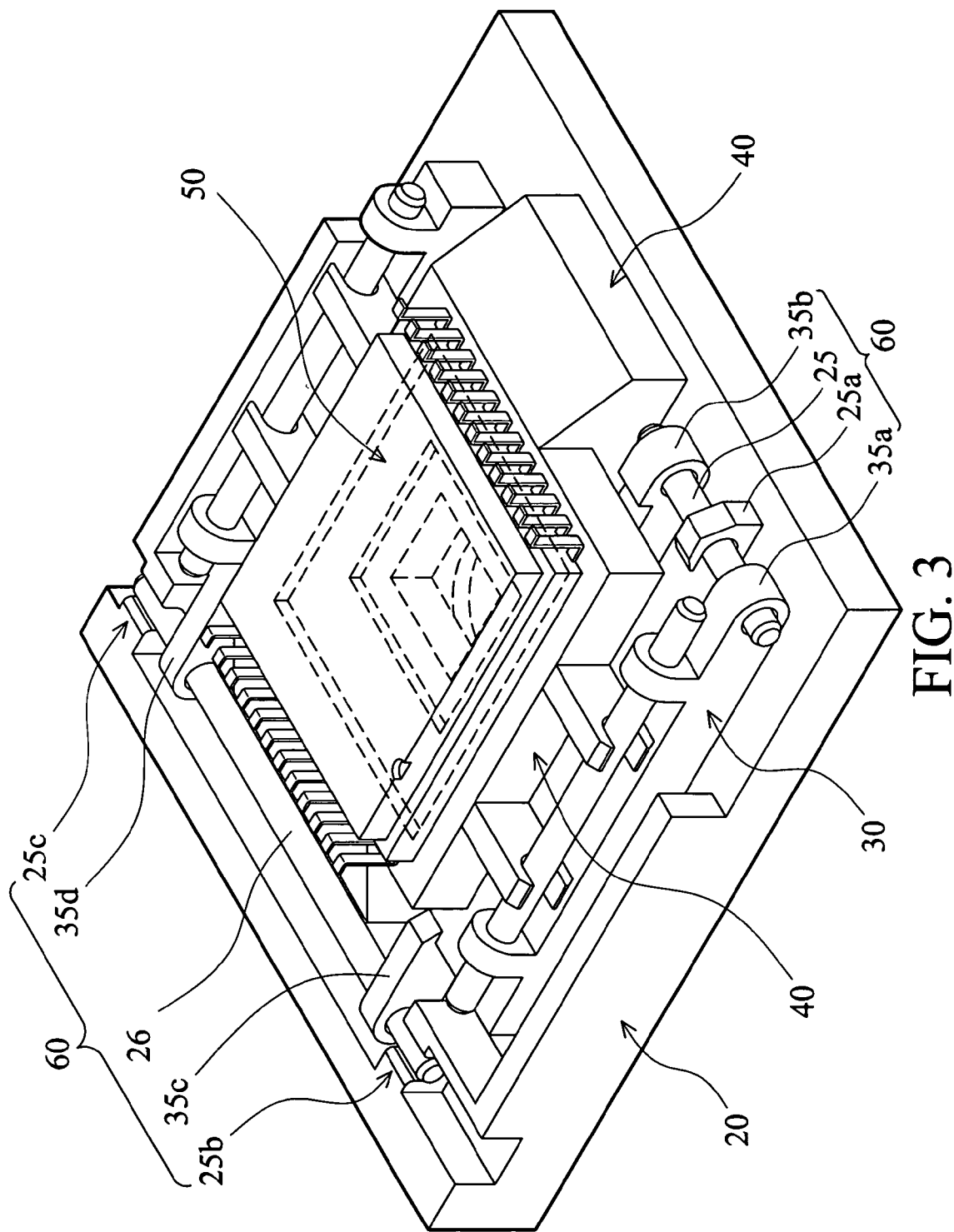
FIG. 3 is a perspective view of an embodiment of an image detecting module of the invention.

Referring to FIG. 3, an embodiment of an image detecting module of the invention comprises a base 20 with a hollow portion 29, a seat 30 disposed in the hollow portion 29, a movable plate 40 disposed in the seat 30, and an image detecting unit 50 (such as a CCD)disposed on the movable plate 40. The sensing surface of the image detecting unit 50 faces opposite the third direction Z.

Figure 4:
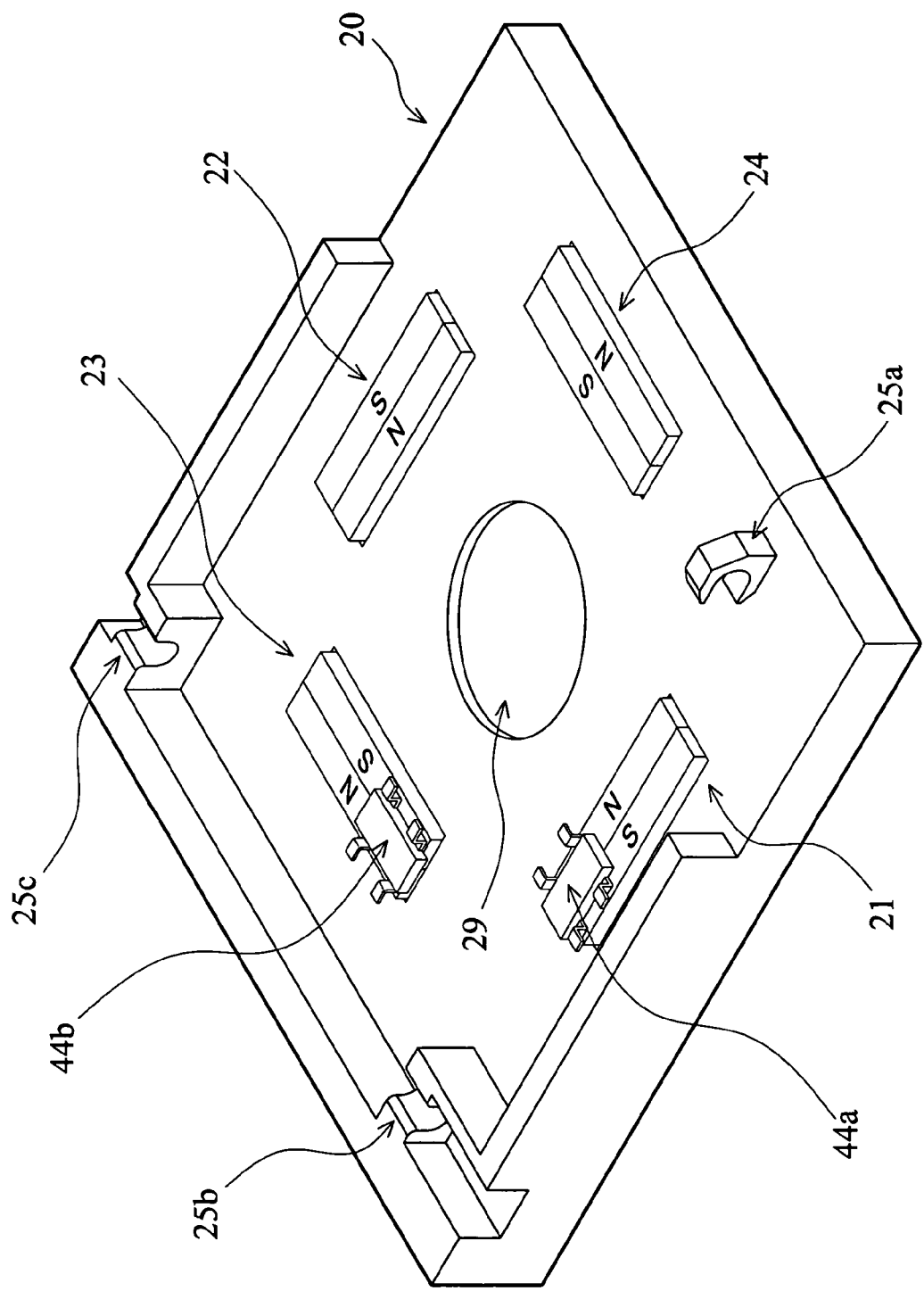
FIG. 4 is a rear view of a base of the image detecting module.

Referring to FIG. 4, the base 20 comprises a pair of first magnets 21 and 22, a pair of second magnets 23 and 24 and a pair of parallel first shafts 25 and 26. The first magnet 21 and 22 are disposed parallel on two sides of the hollow portion 29. The N pole and S pole of the first magnet 21 are disposed along the first direction X, and the N pole and S pole of the first magnet 22 are also disposed along the first direction X. The second magnets 23 and 24 are disposed parallel on two sides of the hollow portions 29. The N pole and the S pole of the second magnet 23 are disposed along the second direction Y, and the N pole and the S pole of the other second magnet 24 are also disposed along the second direction Y. In addition, N poles of the first magnet 21 and 22 face the hollow portion 29, and the S poles of the second magnet 23 and 24 face the hollow portion 29.

Figure 5:
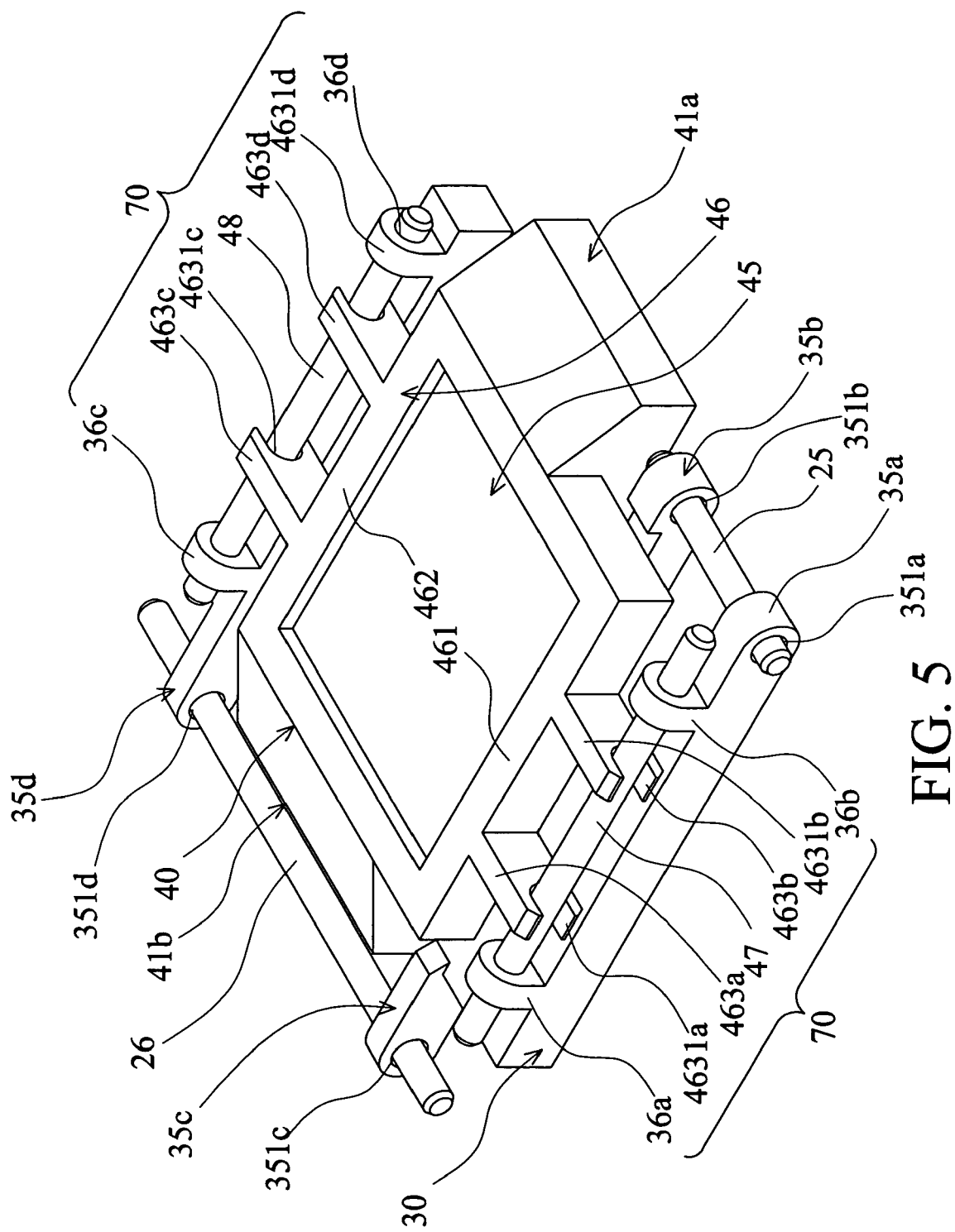
FIG. 5 is a perspective view of a seat with a movable plate of the embodiment of the invention.
Figure 6:
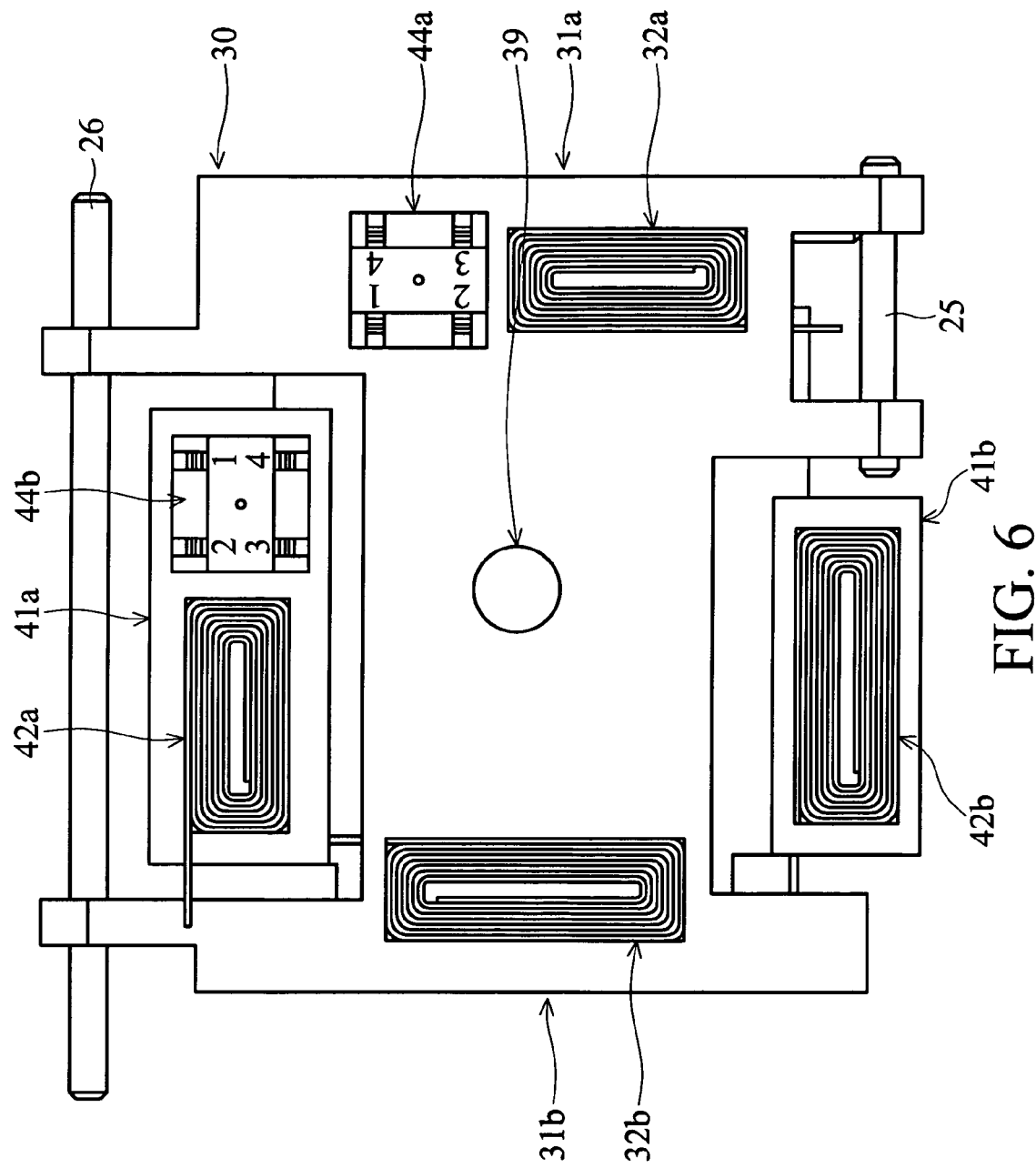
FIG. 6 is a rear view of a seat with a movable plate of the embodiment of the invention.

Referring to FIGS. 5 and 6, the seat 30 has two wing portions 31a and 31b. A pair of first coils 32a and 32b and a first Hall element 44a are disposed on the wing portions 31a and 31b respectively. The first coil 32a is disposed on the wing portion 31a; the first Hall element 44a is also disposed on the wing portion 31a and adjacent to the first coil 32a; the other first coil 32b is disposed on the wing portion 31b. The first coils 32a and 32b are substantially rectangular and their longitudinal sides are parallel. The movable plate 40 also has two wing portions 41a and 41b. A pair of second coils 42a and 42b and a second Hall element 44b are disposed on the wing portions 41a and 41b. The second coil 42a is disposed on the wing portion 41a; the second Hall element 44b is disposed on the wing portion 41a and adjacent to the second coil 42a ; the other second coil 42b is also disposed on the wing portion 41b. The second coils 42a and 42b are also substantially rectangular, and their longitudinal sides are parallel. Two first holding portions 35a and 35b are disposed on the seat 30 adjacent to the wing portion 41a. The first holding portions 35a and 35b have holes 351a and 351b respectively; two first holding portions 35c and 35d are disposed on the seat 30 adjacent to another wing portion 41b. The first holding portion 35c and 35d has holes 351c and 351d.

A pair of first shafts 25 and 26 are parallel. The shorter first shaft 25 is disposed on the side of the magnets 21 and 24, the longer first shaft 26 is disposed on the side of the magnet 23 away from the hollow portion 29. The longer first shaft 26 extends through the holes 351c and 351d and is held by the first holding portions 35c and 35d and fixed to the holding portions 25b and 25c. The shorter first shaft 25 extends through holes 351a and 351b and is fixed by the holding portion 25a. The first shafts 25, 26 and the holding portions 25a, 25b, 25c, 35a, 35b, 35c, 35d constitute a first guide element 60. The seat 30 moves in the first direction X via the first guide element 60.

Referring to FIGS. 5 and 6, the seat 30 has a through hole 39. The image detecting unit 50 is disposed in the through hole 39 on the movable plate 40. The movable plate 40 has a circuit board 45 to which the image detecting unit 50 is electrically connected. A rectangular frame 46 is fixed to the circuit board 45 and surrounds the image detecting unit 50. A pair of parallel frame walls 461 and 462 of the rectangular frame 46 have second holding portions 463a, 463b, 463c and 463d respectively. The second holding portions 463a, 463b, 463c and 463d have holes 4631a, 4631b, 4631c and 4631d respectively. A pair of second shafts 47 and 48 are parallel to the second direction Y. The second shaft 47 extends through the holding portion 36a and 36b on the seat 30 and is inserted into holes 4631a and 4631b and fixed to the seat 30. The other second shaft 48 extends through the holding portions 36c and 36d and holes 4631c and 4631d, whereby the movable plate 40 is joined to the seat 30. The second shafts 47, 48 and the holding portions 36a, 36b, 36c, 36d, 463a, 463b, 463c, and 463d constitute a second guide element 70. The movable plate 40 moves in the second direction Y via the second guide element 70.

Figure 7:
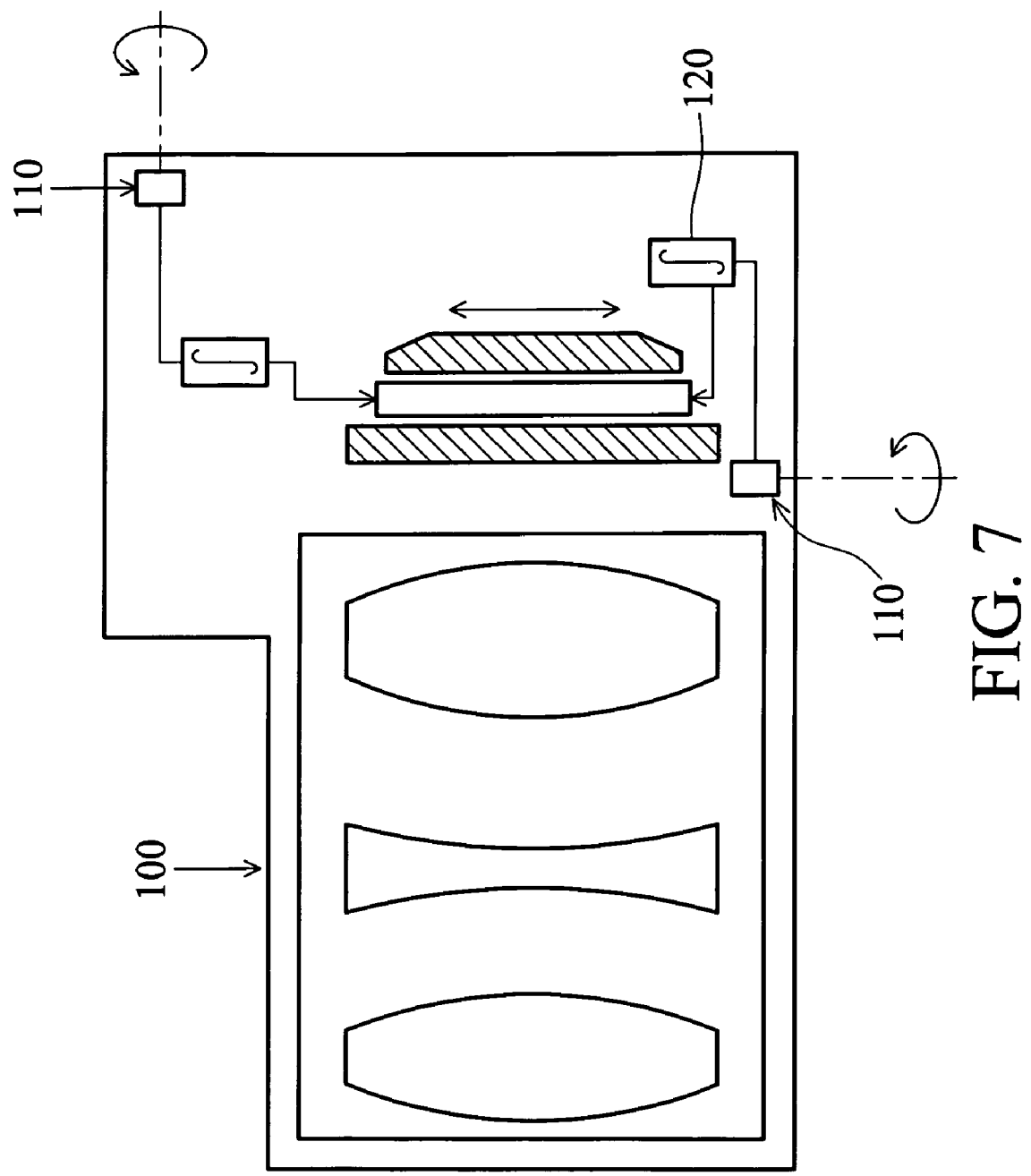
FIG. 7 is a schematic view of a camera having the image detecting module of the invention.

FIG. 7 depicts a camera employing the image detecting unit of the invention. Referring to FIGS. 3 and 7, a camera 100 comprises a motion sensor 110, such as an angular acceleration element or linear acceleration element. When the motion sensor 110 detects motion of the camera 100, a PWM circuit 120 or a digital circuit provides a voltage signal to the first coils 32a, 32b and the second coils 42a and 42b. The first coils 32a, 32b and the second coils 42a, 42b generate variable magnetic field interacting with the first magnet 21, 22 and the second magnet 23, 24, whereby the seat 30 moves in the first direction X, the movable plate 40 moves in the second direction Y, and the image detecting unit 50 moves in the first direction X and the second direction Y correspondingly. Blurring is thereby modified or prevented.

When the camera 100 is still, the image detecting module is also still. At this time, two halves of the first Hall element 44a are located on the N pole and the S pole of the first magnet 21, and two halves of the second Hall element 44b are located on the N pole and the s pole of the second magnet 23. The first and second Hall element 44a and 44b detect no magnetic field variation. When the camera 100 is moved, the first and second coils 42a, 42b, 43a, 43b interact with the first and second magnets 21, 22, 23 and 24 to move the seat 30 in the first direction X and the second direction Y. The Hall element 44a and 44b detects variation of the magnetic field to calculate the displacement and moving frequency of the seat 30, whereby the voltage signal from the PWM circuit and the digital circuit is modified.

Because the invention changes the position of the image detecting unit with respect to the optical axis rather than adjusting the lens position, image quality is affected. Further the pair of coils and a pair of magnets moving the image detecting unit resulting in the element having small volume, allowing reduced camera size.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image detecting module, comprising:
   a base;
   a seat movably disposed on the base;
   an image detecting unit disposed on the seat;
   a first guide member by which the seat is joined to the base, moving relative to the base in a first direction, comprising:
   a plurality of first holding portions disposed on the base and the seat respectively; and
   a pair of first shafts held parallel by the first holding portions, whereby the seat is joined to the base, and the seat moves in the axis of the first shaft;
   a first coil disposed on either the base or the seat;
   a first magnet disposed on either the base or the seat and opposite to the first coil; and
   a first Hall element disposed on either the base or the seat and adjacent to the first coil, wherein a magnetic force is generated between the first coil and the first magnet by providing a voltage to the first coil, moving the seat in the first direction along the first guide element.

2. The image detecting module as claimed in claim 1, wherein the seat further comprises:
   a movable plate movably disposed on the seat;
   a circuit board joined to the movable plate, whereby the image detecting unit is electrically connected to the circuit board and fixed on the movable plate.

3. The image detecting module as claimed in claim 2, further comprising:
   a second guide element by which the movable plate is joined to the seat and moves relative to the seat in a second direction;
   a second coil disposed on either the base or the movable plate;

a second magnet disposed on either the base or the movable plate and opposite to the second coil; and a second Hall element disposed on either the base or the movable plate and adjacent to the second coil, wherein a magnetic force is generated between the second coil and the second magnet by providing a voltage to the second coil, thereby moving the seat along the second guide element in the second direction.

4. The image detecting module as claimed in claim 3, wherein the second guide element comprises:

a plurality of second holding portions disposed on the seat and the movable plate respectively; and a pair of second shaft held parallel by the second holding portions, whereby the movable plate is joined to the seat and moves along the axis of the second shaft.

5. The image detecting module as claimed in claim 4, wherein the axis of the second shaft is perpendicular to the axis of the first shaft.

6. The image detecting module as claimed in claim 4, wherein the second magnet comprises an N pole and an S pole disposed along the axis of the second shaft.

7. The image detecting module as claimed in claim 6, wherein when the image detecting module is still, two halves of the second Hall element are located on the N pole and the S pole of the second magnet respectively.

8. The image detecting module as claimed in claim 1, wherein the first magnet comprises an N pole and an S pole disposed along the axis of the first shaft.

9. The image detecting module as claimed in claim 8, wherein when the image detecting module is still, two halves of the first Hall element are located on the N pole and the S pole of the first magnet respectively.

* * * * *